United States Patent Office 2,936,753
Patented May 17, 1960

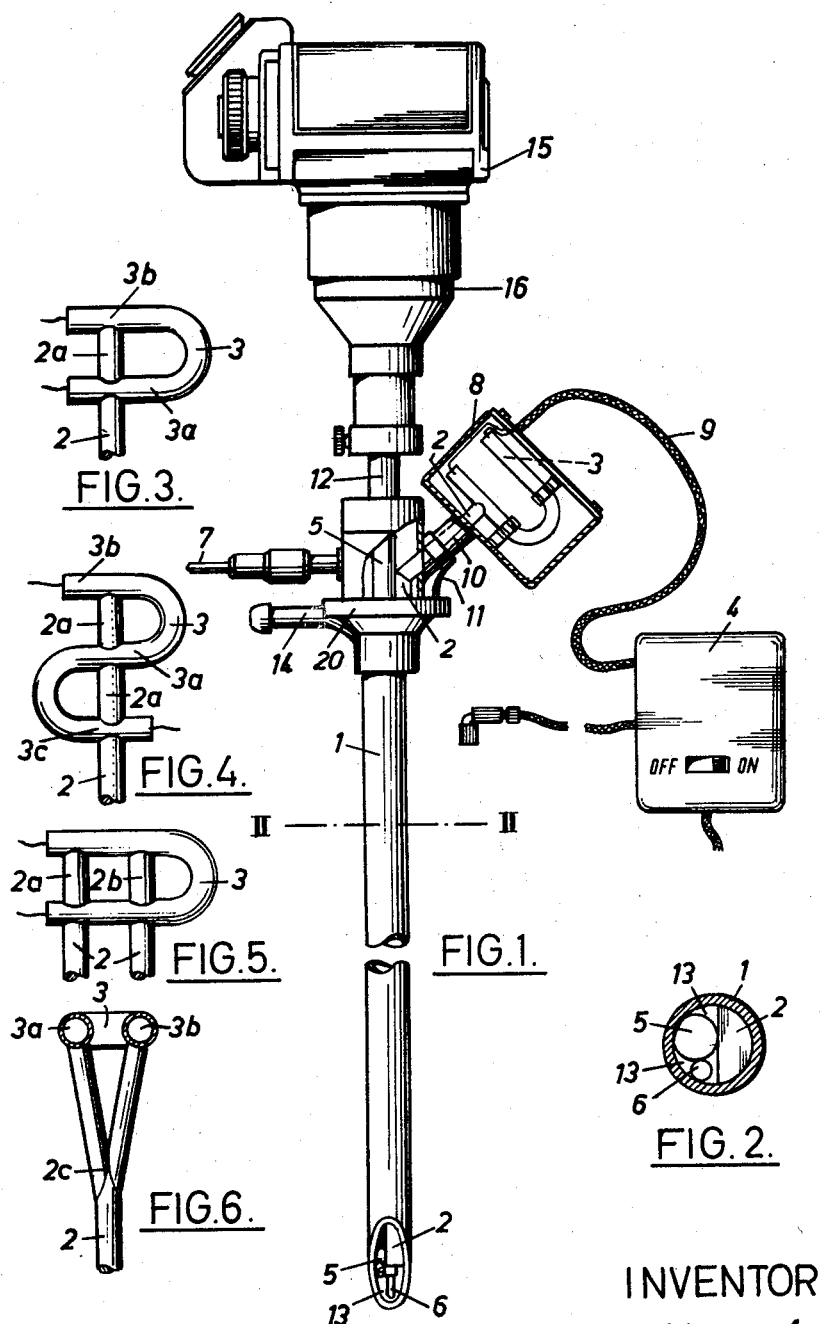

2,936,753
ENDOSCOPE

Karl Storz, Tuttlingen, Germany

Application January 22, 1957, Serial No. 635,443

Claims priority, application Germany June 28, 1956

4 Claims. (Cl. 128—6)

The present invention relates to an endoscope for the photographing of ventricles of the body by means of a telescopic viewing tube and by means of a bar of translucent material, for example quartz glass, serving as light-conductor.

In the photographing of ventricles of the body, color photographing takes on an increasing importance. It is customary, therefore, to employ within the ventricle tube small incandescent lamps, which however, because of the excess-voltage employed, can only have a short lifetime, so that it is frequently necessary to repeat the taking of the pictures.

Also, when instead of an incandescent lamp an electron flash tube is employed at the inner end of the ventricle tube, there are considerable disadvantages. As the electron flash tube then merely illuminates the lateral walls of the ventricle, but does not permit the emission of light rays in the direction of the longitudinal axis of the ventricle tube for the taking of pictures, for example of the wind-pipe, the oesophagus, the bronchial ways etc.

Another type of endoscope is so devised that instead of the small incandescent lamp or instead of the electron flash tube arranged at the inner end of the ventricle tube, a strong incandescent lamp is arranged at the outer end of the ventricle tube. Whereby the light rays are condensed by a condenser and conducted within the ventricle tube by means of a bar of translucent material (quartz glass or the like) serving as light-conductor to the place where the pictures are taken. Although the brightness obtained in this way usually suffices for the exposure of color films, it is nevertheless true that the size of the device is thereby increased to such an extent that the device is rendered too cumbersome for the examinations preceding the taking of the picture, so that a considerate treatment of the patient is practically impossible. In addition to this, it is necessary to employ a light-conductor of comparatively large cross-section, which takes up a large portion of the inner space of the ventricle tube, whereby the use of instruments for the surgical treatment is seriously interfered with.

According to the invention these disadvantages of known endoscopes are overcome by the feature that an electron flash tube is arranged in the area of the outer end of the light-conductor. The construction is preferably so devised that the light-conductor and the telescopic viewing tube form a structural unit adapted for introduction into the ventricle tube. The electron flash tube is detachably secured to the light-conductor or arranged in the latter and preferably enclosed in a housing of non-transparent material. It is further possible to arrange the electron flash tube separately from the appertaining ignition transformer and to connect the two with each other by a cable conducting the current.

The endoscope of the invention has a variety of considerable advantages, for example: a brightness sufficing for taking color pictures at shortest time of exposure; complete lighting up of the ventricle; smallest dimensions and lowest weight facilitating an easy manipulation; small cross-section of the ventricle tube. The light-conductor can be pulled out of the ventricle tube and thus enables its disinfection and its exchange for a light-conductor which permits the emission of light rays within the ventricle in a required direction. It is further possible to employ the light-conductor in combination with a telescopic viewing tube, when in case of conveniently accessible ventricles a ventricle tube is not needed.

The construction may be so devised that the electron flash tube is detachably secured to the outer end of the light-conductor or arranged in the latter. However, it is also possible to secure the light-conductor in light-conducting fashion to all legs of a double-legged or multi-legged electron flash tube. This may be done in such manner that the light-conductor is secured in the plane of a double-legged or multi-legged electron flash tube to one of the legs of the tube, while connections between the several legs serve as extensions of the light-conductor. Or the construction may be so devised that the light-conductor is secured in light-conducting fashion via the ends of a fork-shaped end piece with the two legs of an electron flash tube.

Additional features and advantages of the invention will be understood from a consideration of the following detailed description taken in connection with the accompanying drawings forming a part of this specification and in which an embodiment of the invention has been shown by way of example. However, I wish to say that the invention is not confined to any strict conformity with the showing of the drawings but may be changed or modified, so long as such changes or modifications mark no material departure from the salient features of the invention as expressed in the appending claims.

In the drawings, in which like parts are referred to by the same reference numerals in all of the several figures, Fig. 1 is a perspective view of the entire endoscope;

Fig. 2 is a cross-section, on an enlarged scale, on line II—II of Fig. 1;

Fig. 3 is a detail view showing the end of the light-conductor secured to both of the legs of a U-shaped electron flash tube;

Fig. 4 is a detail view of a light-conductor secured to all of the legs of a multi-legged electron flash tube;

Fig. 5 is a detail view of two light-conductors secured to both legs of a U-shaped electron flash tube;

Fig. 6 is a detail view of the forked end of a light-conductor having the free ends of the forked piece secured to both legs of a U-shaped electron flash tube.

In the embodiment illustrated in the drawings, the reference numeral 1 designates the ventricle tube. 2 is the bar of translucent material serving as conductor for the light. 3 is the electron flash tube. 4 is the ignition transformer. 5 is the telescopic viewing tube. 6 is the incandescent lamp illuminating the ventricle during the examination and treatment. The connection to the source of current for the incandescent lamp 6 is effected by means of a connecting branch 7.

The electron flash tube 3 is enclosed in a housing 8 of non-transparent material, separately from the ignition transformer 4, which by means of a conductor of current 9 is connected with the electron flash tube 3.

The light-conductor 2 is provided at its outer end with a metal sleeve 10 serving as a means for the detachable connection to the housing 8 of the electron flash tube 3.

The light-connector 2 having the shape of a bar of translucent material, for example quartz glass, Plexiglas or the like, is secured by means of a supporting member 11 to the electron flash tube, while the telescopic viewing tube 5 is secured by means of a supporting member 12 to the outer end of the ventricle tube 1.

The interior arrangement of the ventricle tube 1 is shown in Fig. 2, where the space between the telescopic viewing tube 5 and the light-conductor 2 is denoted by 13. This space 13 serves in combination with the connecting branch 14 for the admission of oxygen. The camera 15 is in customary manner combined with the eye-piece 16 of the telescopic viewing tube 5.

The light conductor 2 as well as the telescopic viewing tube 5 are merely loosely inserted into the ventricle tube 1 and then by means of a clamping device 11 operable with the aid of a screwing contrivance 20, tightly but detachably secured in correct position with respect to each other and with respect to the electron flash tube, whereby the supporting member 11 bears against the metal sleeve 10, and whereby the metal sleeve 10 is detachably secured to the housing 8 of the electron flash tube 3, and whereby the outer end of the light-conductor 2 projects through the metal sleeve 10 into the housing 8 and rests or may be made to rest against one of the legs of the electron flash tube 3, as shown in broken lines in Fig. 1. However, in order to increase the yield of light, the light-conductor 2 may be secured in the plane of the electron flash tube 3 to one of the legs 3a of the tube, while by means of an extension 2a a connection between the two legs 3a and 3b is established, as shown in Fig. 3. According to Fig. 4, the light-conductor 2 may be completed by means of two connecting members or extensions 2a provided between the three legs 3a, 3b, 3c of a multi-legged electron flash tube 3.

In another form of construction, shown in Fig. 5, two extensions 2a and 2b of two light-conductors 2 are bridging the space between the two legs of a U-shaped electron flash tube 3. The two light-conductors 2 may be separately guided to different places where pictures are taken, or be united in fork-shaped fashion or via an optic lens system in such manner that the accumulated light rays are guided in a single light-conductor to the place where the pictures are taken.

In the form of construction shown in Fig. 6, the two outer ends of a forked light-conductor 2 are secured to the legs 3a and 3b of an electron flash tube 3. At the fork joint 2c the converging light rays may be united by means of an optic lens system, whereupon the accumulated light rays are conducted by the conductor 2 to the place where the pictures are taken. The light-conductor 2 may also be forked in more than two ends, whereupon all of the ends are secured to the legs of the electron flash tube in light-conducting fashion.

What I claim as new and desire to secure by Letters Patent of the United States is:

1. In an endoscope provided with a telescopic viewing tube and with an elongated bar light-conductor of translucent material enclosed in a ventricle tube, an electron flash tube of the multi-legged type enclosed in a housing of non-transparent material and having the outer end of said translucent light-conductor connected to all of the legs of the electron flash tube; and an ignition transformer arranged at a distance from said electron flash tube and connected with said electron flash tube by a cable serving as conductor of current.

2. In an endoscope provided with a telescopic viewing tube and with an elongated bar light-conductor of translucent material enclosed in a ventricle tube, an electron flash tube of the multi-legged type enclosed in a housing of non-transparent material and having the outer end of said translucent light-conductor connected to one of the legs of the electron flash tube and having the plurality of legs of the electron flash tube connected with each other by at least one extension of the translucent light-conductor; and an ignition transformer arranged at a distance from said electron flash tube and connected with said electron flash tube by a cable serving as a conductor of current.

3. In an endoscope provided with a telescopic viewing tube and with an elongated bar light-conductor of translucent material enclosed in a ventricle tube, an electron flash tube of the two-legged type enclosed in a housing of non-transparent material and having the outer end of said translucent light-conductor provided with a fork-shaped end portion and having each of the two legs of the electron flash tube connected to a free end of the fork-shaped end of the translucent light-conductor; and an ignition transformer arranged at a distance from said electron flash tube and connected with said electron flash tube by a cable serving as a conductor of current.

4. In an endoscope provided with a telescopic viewing tube, an electron flash tube of the parallel, spaced leg type enclosed in a housing of non-transparent material, an elongated bar light-conductor of translucent material enclosed in a ventricle tube and having an end abutting one of the flash tube legs and having an extension aligned with the main body of the light-conductor with the ends of the extension abutting spaced legs of the flash tube, and an ignition transformer connected to said electron flash tube by a current conductor cable.

References Cited in the file of this patent

UNITED STATES PATENTS

| | | |
|---|---|---|
| 1,550,197 | Berry | Aug. 18, 1925 |
| 1,706,161 | Hollnagel | Mar. 19, 1929 |
| 2,093,735 | Prouty | Sept. 21, 1937 |
| 2,324,075 | Gillon et al. | July 13, 1943 |
| 2,699,770 | Fourestier et al. | Jan. 18, 1955 |
| 2,761,087 | Bowtell | Aug. 28, 1956 |

FOREIGN PATENTS

| | | |
|---|---|---|
| 505,420 | Belgium | Sept. 15, 1951 |
| 498,571 | Italy | Sept. 30, 1954 |
| 1,125,592 | France | July 16, 1956 |